United States Patent
Cambou et al.

(10) Patent No.: US 10,345,091 B2
(45) Date of Patent: *Jul. 9, 2019

(54) APPARATUS AND METHOD FOR MAGNETIC SENSOR BASED SURFACE SHAPE ANALYSIS

(71) Applicant: Crocus Technology Inc., Santa Clara, CA (US)

(72) Inventors: Bertrand F. Cambou, Flagstaff, AZ (US); Ljubisa Ristic, Rescue, CA (US); Jian Wu, San Jose, CA (US); Douglas Lee, San Jose, CA (US); Ted Stokes, Santa Clara, CA (US); Ken Mackay, Le Sappey en Chartreuse (FR)

(73) Assignee: CROCUS TECHNOLOGY INC., Santa Clara, CA (US)

( * ) Notice: Subject to any disclaimer, the term of this patent is extended or adjusted under 35 U.S.C. 154(b) by 503 days.

This patent is subject to a terminal disclaimer.

(21) Appl. No.: 14/859,117

(22) Filed: Sep. 18, 2015

(65) Prior Publication Data

US 2016/0084674 A1    Mar. 24, 2016

Related U.S. Application Data

(60) Provisional application No. 62/053,076, filed on Sep. 19, 2014.

(51) Int. Cl.
*G01B 7/24* (2006.01)
*G01L 5/00* (2006.01)
*G01B 7/287* (2006.01)

(52) U.S. Cl.
CPC .............. *G01B 7/24* (2013.01); *G01B 7/287* (2013.01); *G01L 5/00* (2013.01)

(58) Field of Classification Search
CPC ........ G01R 33/07; G01R 33/09; G01R 33/02; G01R 15/202
USPC ........................ 324/200, 244–263, 500, 524, 324/207.13–207.14, 529, 530, 750.16
See application file for complete search history.

(56) References Cited

U.S. PATENT DOCUMENTS

| | | |
|---|---|---|
| 3,929,519 A | 12/1975 | Benz |
| 7,165,453 B2 | 1/2007 | Flora et al. |
| 7,701,202 B2 * | 4/2010 | Torres-Jara ............... G01L 5/16 324/207.2 |
| 7,876,288 B1 * | 1/2011 | Huang .................. G06F 1/1616 345/178 |
| 8,079,925 B2 * | 12/2011 | Englert .............. A63B 24/0021 473/569 |

(Continued)

OTHER PUBLICATIONS

International Search Report and Written Opinion for International Patent Application No. PCT/US2015/051084, dated Dec. 15, 2015, 9 pgs.

(Continued)

*Primary Examiner* — Melissa J Koval
*Assistant Examiner* — Trung Nguyen
(74) *Attorney, Agent, or Firm* — Cooley LLP

(57) ABSTRACT

A device has magnetic sensors and magnets in an array on a flexible substrate. Each magnetic sensor is sensitive to immediately proximate magnets. At least one controller evaluates magnetic sensor signals from the magnetic sensors produced in response to deformation of the flexible substrate.

18 Claims, 12 Drawing Sheets

(56) References Cited

U.S. PATENT DOCUMENTS

| | | | | |
|---|---|---|---|---|
| 8,232,963 | B2* | 7/2012 | Orsley | G06F 3/0338 345/157 |
| 8,547,197 | B2* | 10/2013 | Byun | H01C 10/10 338/114 |
| 2002/0061735 | A1 | 5/2002 | Wingett et al. | |
| 2009/0184706 | A1 | 7/2009 | Duric et al. | |
| 2012/0103097 | A1 | 5/2012 | Lopez Jauregui | |
| 2012/0154288 | A1* | 6/2012 | Walker | G06F 1/1616 345/169 |
| 2016/0097630 | A1* | 4/2016 | Lombard | G01B 7/24 324/207.11 |

OTHER PUBLICATIONS

Extended European Search Report dated Feb. 22, 2018, for EP Application No. 15 841 310.4, filed on Sep. 18, 2015, 8 pages.
Miya, K. et al. (1998). "Applied electromagnetics research and application," *Prog. Nucl. Energy* 32:179-194.

* cited by examiner

APPARATUS AND METHOD FOR MAGNETIC SENSOR BASED SURFACE SHAPE ANALYSIS

CROSS-REFERENCE TO RELATED APPLICATION

This application claims priority to U.S. Provisional Patent Application Ser. No. 62/053,076, filed Sep. 19, 2014, the contents of which are incorporated herein by reference.

FIELD OF THE INVENTION

This invention relates generally to analyzing surface shape. More particularly, this invention relates to techniques for magnetic sensor based surface shape analysis.

BACKGROUND OF THE INVENTION

Sensors play a crucial role in modern technology as they have become an essential part of millions of products that we use every day. Sensors can be found in every imaginable type of product from consumer and industrial products, to communications, automotive and biomedical products. The same is true for magnetic sensors that are used widely in consumer, communications, computer, industrial, automotive, biomedical and precision instrumentation products.

A variety of sensor devices have been used for surface position and shape sensing including optical sensors and stress sensors, such as piezoresistive sensors and piezoelectric sensors. These solutions experience system complexity, high cost and poor performance. Accordingly, it would be desirable to provide new techniques for surface position and shape sensing.

SUMMARY OF THE INVENTION

A device for surface shape analysis includes a flexible substrate supporting magnetic sensors and magnets or current conductors operative as a magnetic field source. One or more controller circuits receive magnetic sensor signals from the magnetic sensors. The one or more controllers collect reference magnetic sensor signals when the flexible substrate is flat, first polarity magnetic sensor signals in response to position change of the flexible substrate in a first direction and second polarity magnetic sensor signals in response to position change of the flexible substrate in a second direction.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
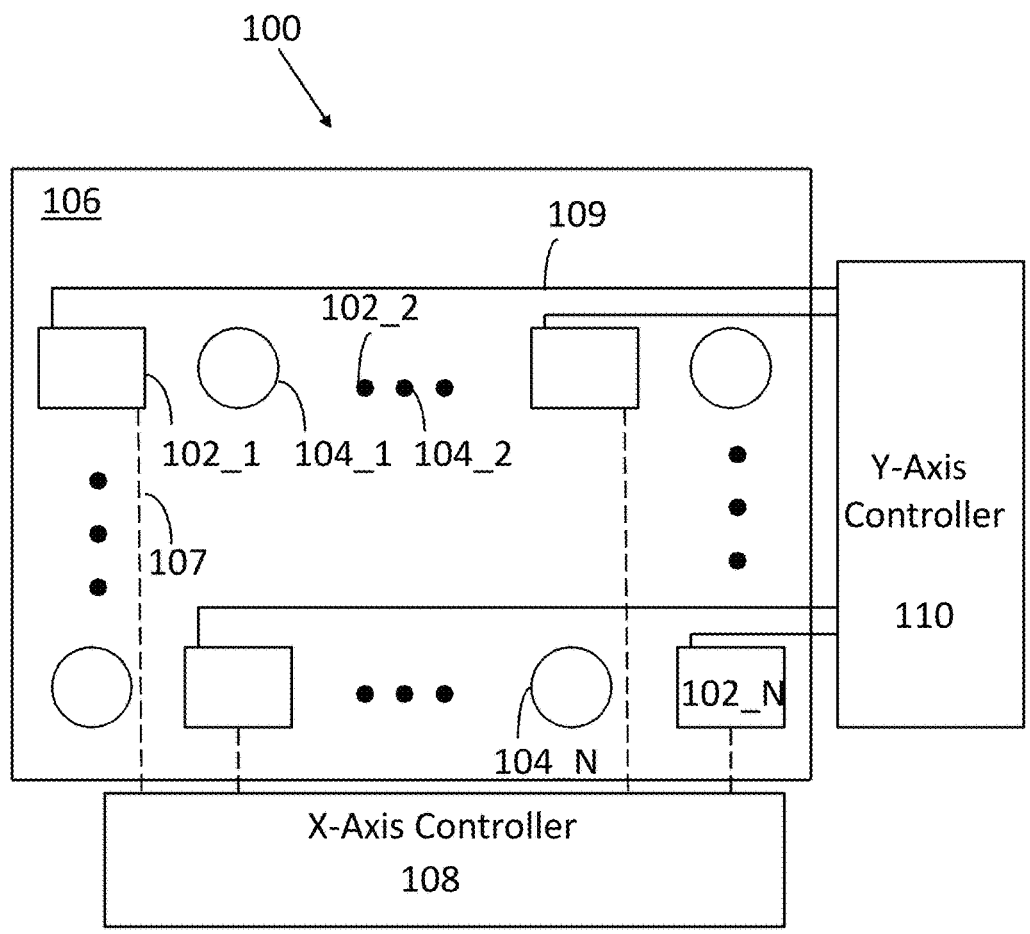
FIG. 1 illustrates a magnetic sensor surface shape analysis system configured in accordance with an embodiment of the invention.

FIG. 1 illustrates a magnetic sensor surface shape analysis system 100 configured in accordance with an embodiment of the invention. The system 100 includes a set of magnetic sensors 102_1 through 102_N and a set of accompanying magnets 104_1 through 104_N positioned on a flexible substrate 106 (e.g., polyimide or similar material). Each magnetic sensor 102 is identical and has an axis of sensitivity oriented in a direction defined by a predetermined pattern used to cover the surface 106. Each magnet has the same strength of magnetic field.

Each sensor 102 has a link 107 to an X-axis controller 108 and a link 109 to a Y-axis controller 110. The controllers 108 and 110 may be positioned on or outside of the flexible substrate 106. The controllers 108 and 110 may be combined into a single controller.

Link 107 is shown as a dashed line to suggest that it might be on a different plane of the substrate 106 (i.e., the substrate 106 may have multiple conductive layers). The matrix configuration of FIG. 1 is exemplary. As discussed below, other sensor and magnet configurations are utilized in accordance with embodiments of the invention.

Each magnetic sensor 102 may be any type of magnetic sensor, such as a Hall device, Anisotropic Magnetic Resistance (AMR) sensor, Giant Magnetic Resistance (GMR) sensor and/or magnetic logic unit (MLU) sensor. In one embodiment, an MLU sensor of the type described in U.S. Ser. No. 13/787,585 (the '585 application), filed Mar. 6, 2013, is used. The '585 application is owned by the owner of this patent application and is incorporated herein by reference.

By way of overview, the MLU sensor disclosed in the '585 application has circuits, where each circuit includes multiple magnetic tunnel junctions, and each magnetic tunnel junction includes a storage layer having a storage magnetization direction and a sense layer having a sense magnetization direction. A field line is configured to generate a magnetic field based on an input. The sense magnetization direction of each magnetic tunnel junction is configured based on the magnetic field. Each magnetic tunnel junction is configured such that the sense magnetization direction and a resistance of the magnetic tunnel junction vary based on an external magnetic field. A sensing module is configured to determine a parameter of each of the circuits. The parameter is selected from impedance, voltage and current. The parameter of each of the circuits varies based on the resistances of the multiple magnetic tunnel junctions included in each of the circuits. A magnetic field direction determination module is configured to determine an angular orientation of the apparatus relative to the external magnetic field based on the parameter of each of the circuits. The magnetic field direction determination module is implemented in at least one of a memory or a processing device.

An advantage of the MLU sensor disclosed in the '585 application is that the sensor may be placed 1-5 cm from a small magnet and still register a signal. Many comparable magnetic sensors need to be within 1 mm of a small magnet to register a signal. Accordingly, an embodiment of the invention has high sensitivity. This allows for larger sensor spacing, which reduces cost and preserves high flexibility in the substrate 106. The sensor of the '585 application has a desirable frequency response. Another advantage of the magnetic sensor of the '585 application is that it allows for positive and negative sense signaling, as discussed below.

Figure 2:
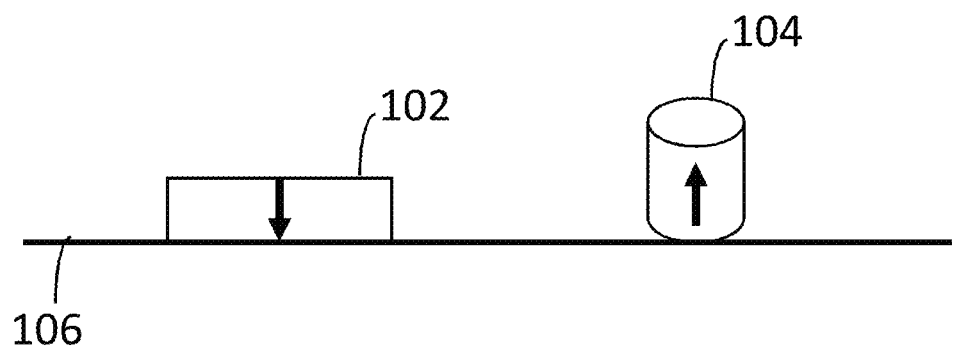
FIG. 2 is a side view of a single magnetic sensor and accompanying magnet on a flat surface that results in a reference signal from the magnetic sensor.

FIG. 2 is a side view of a magnetic sensor 102 and an adjacent magnet 104. In this instance, the substrate 106 is flat. The magnet 104 produces a magnetic field that is orthogonal to the flat surface. The magnetic sensor 102 is positioned to receive an orthogonal magnetic field and therefore generates a reference output (i.e., zero or below some minimum threshold).

Figure 3:
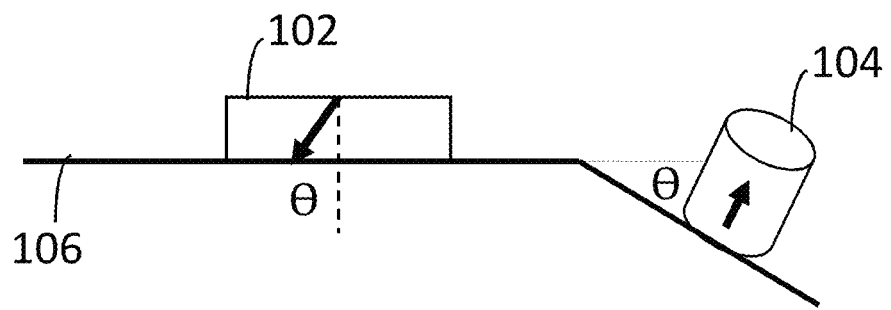
FIG. 3 is a side view of a downwardly deformed surface that causes the magnetic sensor to generate a signal with a first polarity.

In FIG. 3, the surface 106 is deformed in a downward direction. As a result, the magnetic sensor 102 receives a non-orthogonal magnetic field, which induces a first polarity magnetic sensor signal. FIG. 3 illustrates an angle $\Theta$ produced by the deformation of the surface 106. The angle characterizes the deformation of the flexible substrate 106. The first polarity magnetic sensor signal may be characterized as the sine function of the angle $\Theta$. That is, the first polarity magnetic sensor signal may be expressed as $Ao \times Sin(\Theta)$, where Ao is the absolute value of the vector of magnetic induction.

Figure 4:
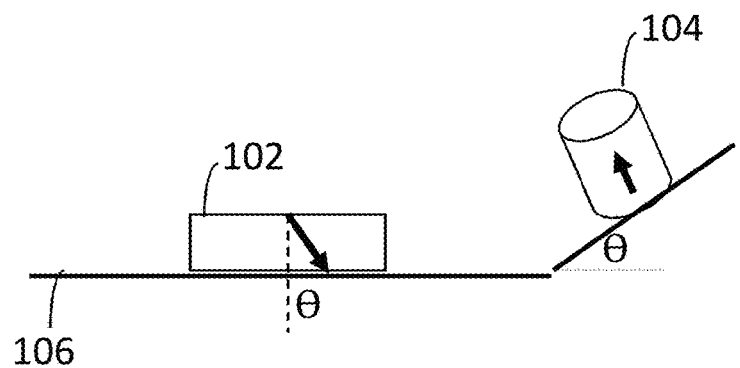
FIG. 4 is a side view of an upwardly deformed surface that causes the magnetic sensor to generate a signal with a second polarity.

FIG. 4 illustrates the surface 106 deformed in an upward direction. As a result, the magnetic sensor 102 receives a non-orthogonal magnetic field, which induces a second polarity magnetic sensor signal. The second polarity sensor signal may be characterized as the negative sine function of the angle $\Theta$.

Figure 5:
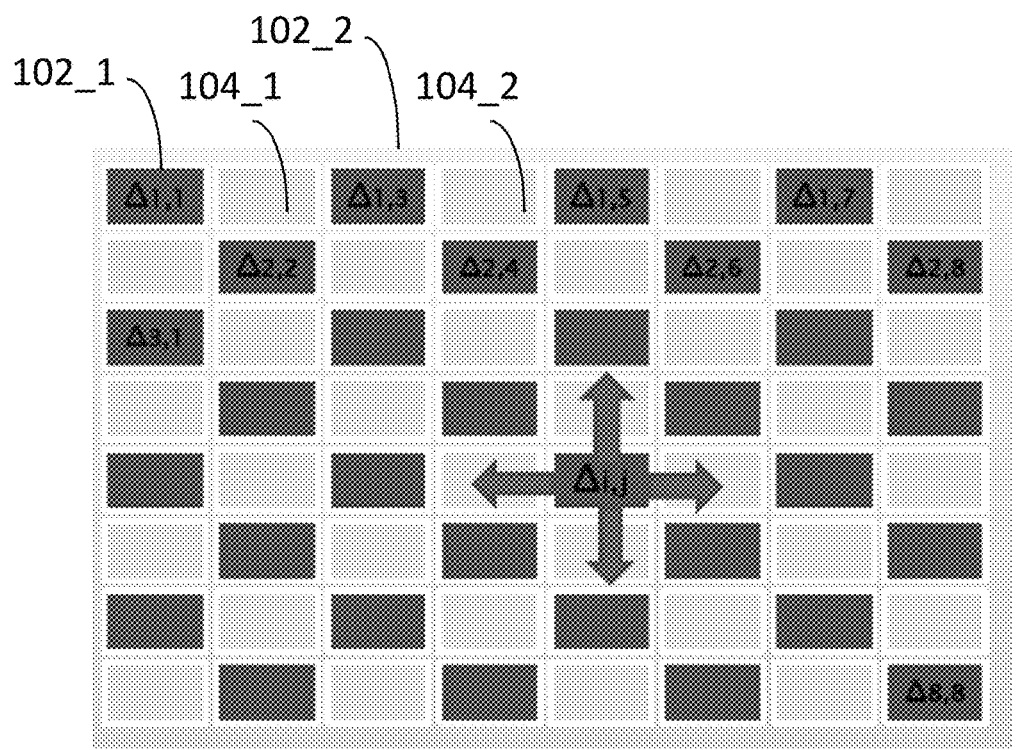
FIG. 5 is a top view of a matrix of magnetic sensors and magnets.

Thus, it can be appreciated that obtaining information from all sensors distributed over the surface 106 provides precise information on the shape of the surface. Consider the positional schema of FIG. 5, which corresponds to the structure of the system 100 of FIG. 1. A simplified equation of the near range sensor interactions for sensor $\Delta i,j$ may be expressed as: $\Delta i,j = Ao \times [Sin(\Theta ij, ij-1) + Sin(\Theta ij, ij+1) + Sin(\Theta ij, i-1j) + Sin(\Theta ij, i+1j)]$. In one embodiment, the system is configured such that only adjacent magnets induce a deviation different than the reference signal if the bending is along the x-axis or the y-axis. The physical position of each sensor is known. Therefore, the position can be correlated with the magnetic sensor signal to develop a shape profile for each position on the surface 106.

Figure 6:
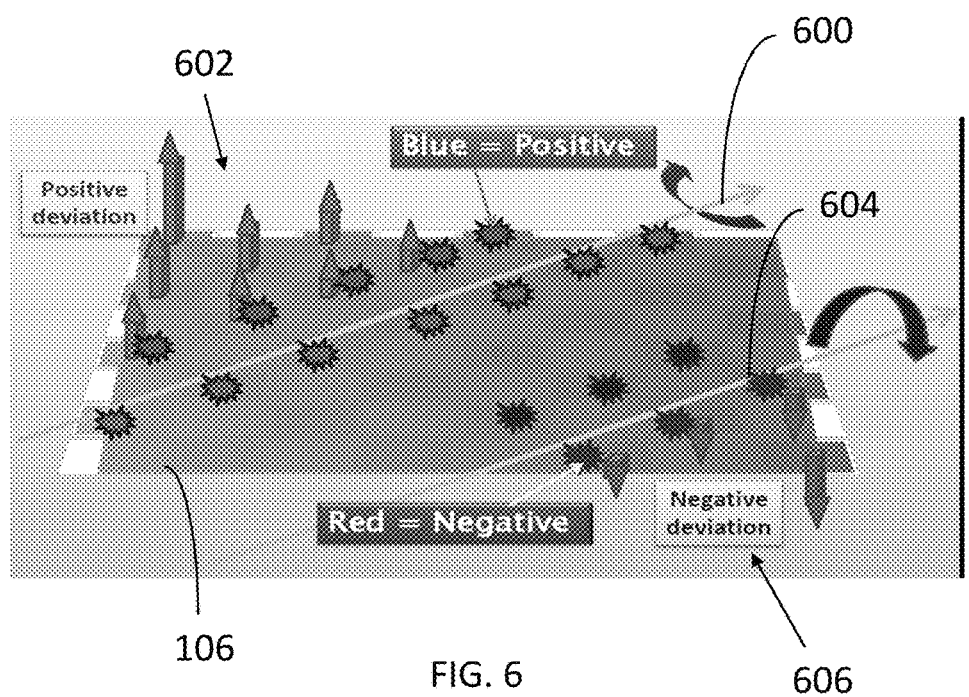
FIG. 6 is a schematic view of upward and downward surface deformations evaluated in accordance with an embodiment of the invention.

FIG. 6 illustrates a situation where the surface 106 is bent along two diagonals. In particular, there is an upward diagonal force 600 producing positive deviations 602 and there is a downward diagonal force 604 producing negative deviations 606.

Returning to FIG. 1, it can be appreciated that the X-axis controller 108 samples magnetic sensor signals to identify movement along the X-axis, while the Y-axis controller samples magnetic sensor signals to identify movement along the Y-axis. Various sampling techniques may be used. For example, in a quiescent state a first sampling rate may be used across the entire surface 106. Upon detection of movement within a region of the surface, the sampling rate may be increased in the subject region. The controllers 108 and 110 may track the rate of change over time. Accordingly, surface profiles over time may be produced.

Figure 7:
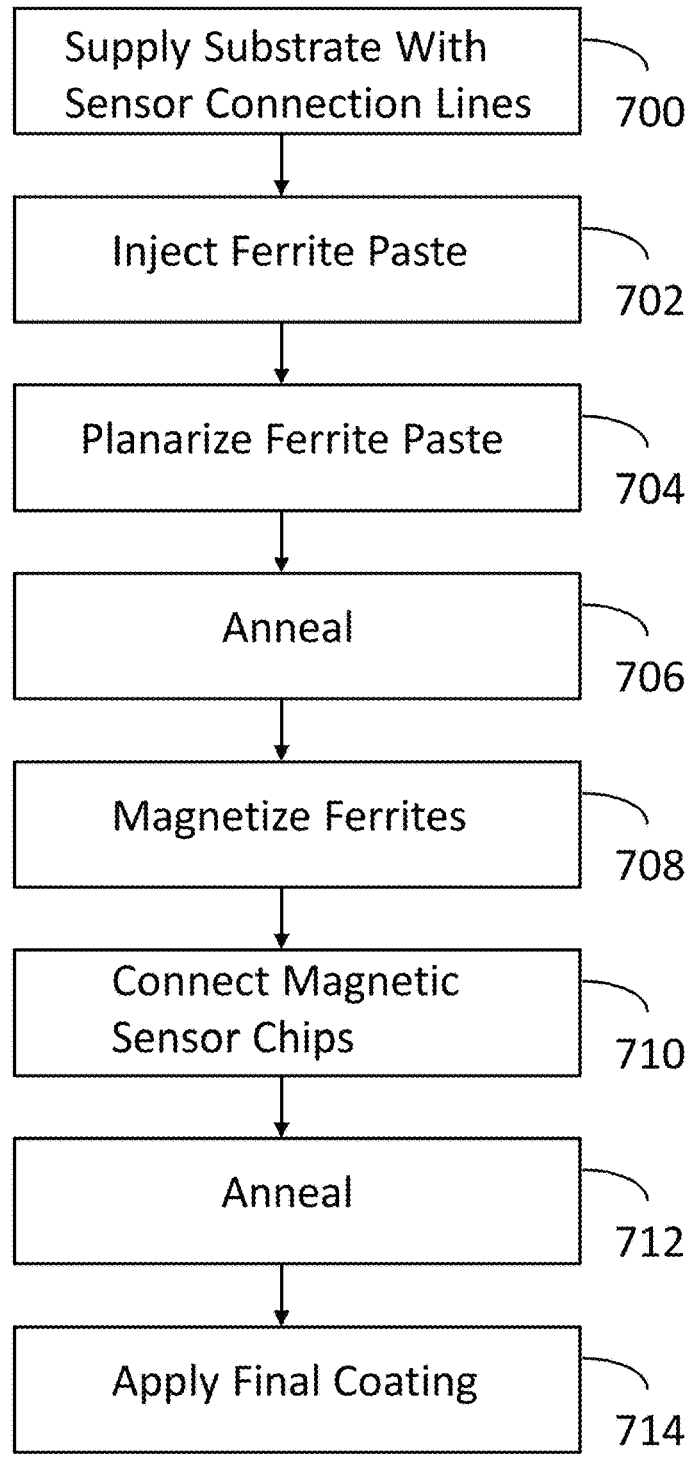
FIG. 7 illustrates processing operations to construct a system in accordance with an embodiment of the invention.
Figure 8:
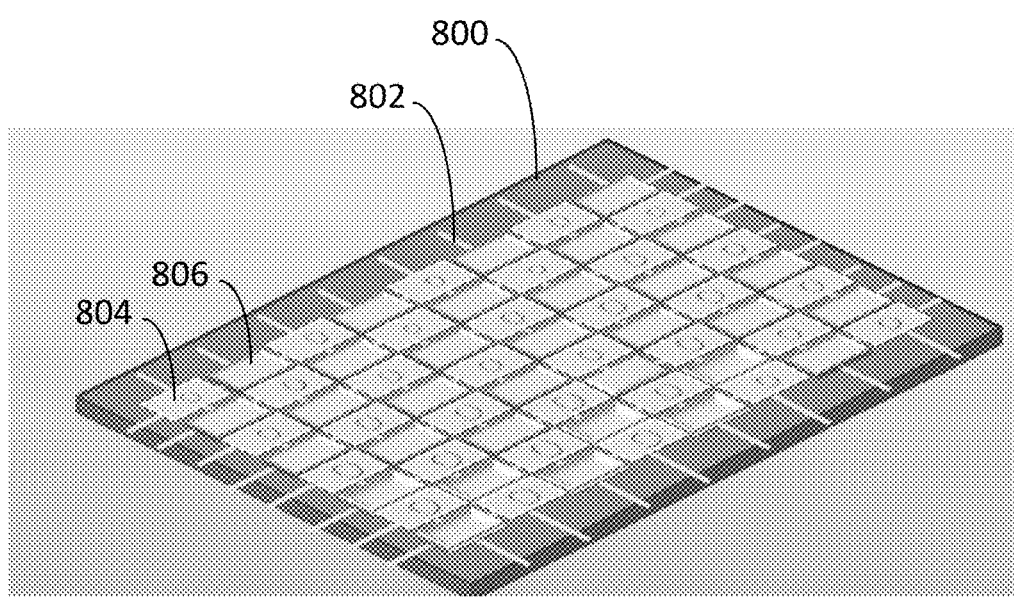
FIG. 8 illustrates a substrate processed in accordance with an embodiment of the invention.

FIG. 7 illustrates processing operations associated with the fabrication of the disclosed device. Initially, a substrate with sensor connection lines is supplied 700. FIG. 8 illustrates an exemplary substrate 800 with sensor connection lines 802. There are regions 804 for locating magnetic sensors 804 and regions 806 for locating magnets. The substrate 800 is a flexible material, such as polyimide.

Figure 9:
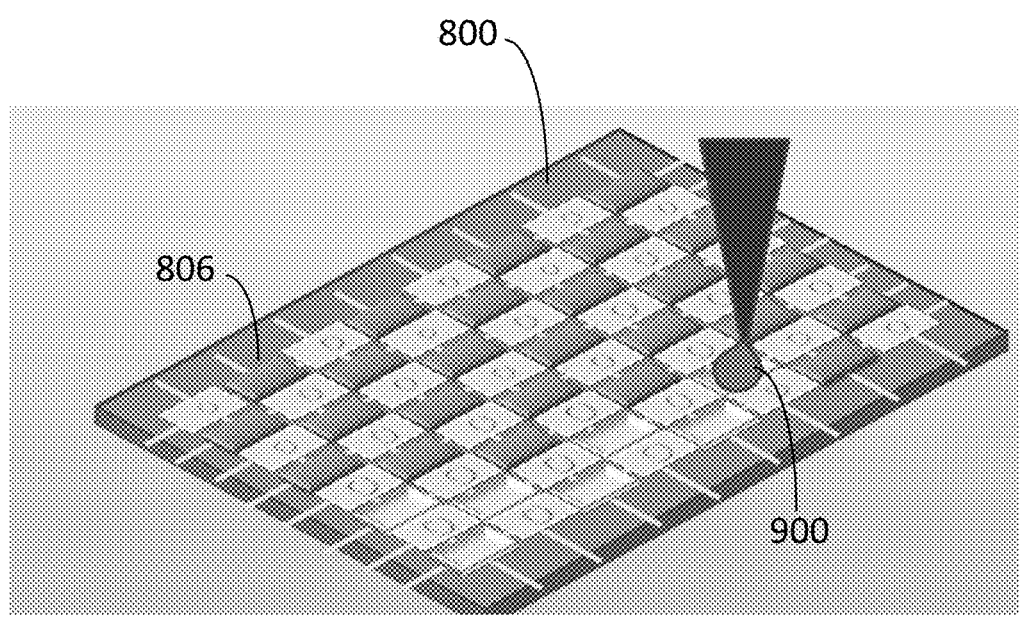
FIG. 9 illustrates ferrite deposition performed in accordance with an embodiment of the invention.

Returning to FIG. 7, the next processing operation is to inject a ferrite paste 702. FIG. 9 illustrates a ferrite paste 900 being injected in regions 806. The next operation is to planarize the ferrite paste 704. The ferrite paste may be planarized through chemical and/or mechanical polishing.

Figure 10:
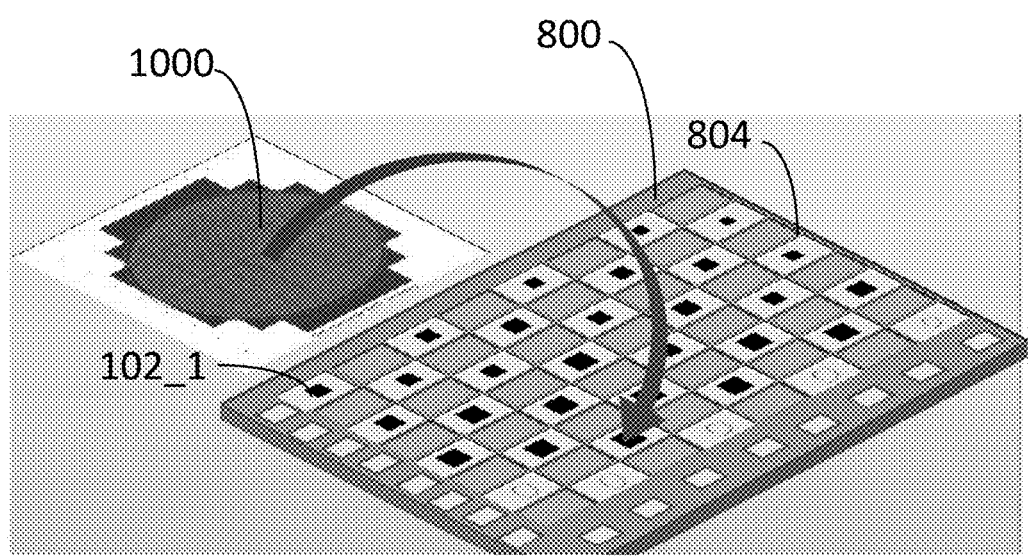
FIG. 10 illustrates magnetic sensor positioning performed in accordance with an embodiment of the invention.

Next, the substrate is annealed 706. The ferrites are then magnetized 708. Magnetic sensor chips are then connected 710. FIG. 10 illustrates a wafer 1000 with a plurality of magnetic sensors. Magnetic sensors, such as magnetic sensor 102_1, are positioned in regions 804. The substrate is then annealed once again 712. A final protective coating is then applied 714.

Figure 11:
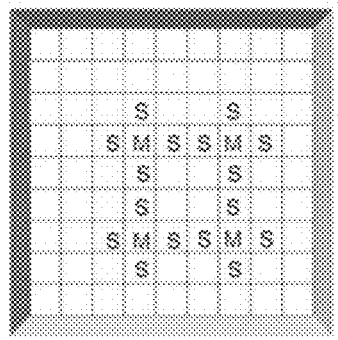
FIGS. 11-12 illustrate a magnetic sensor and magnet configuration in accordance with an embodiment of the invention.
Figure 12:
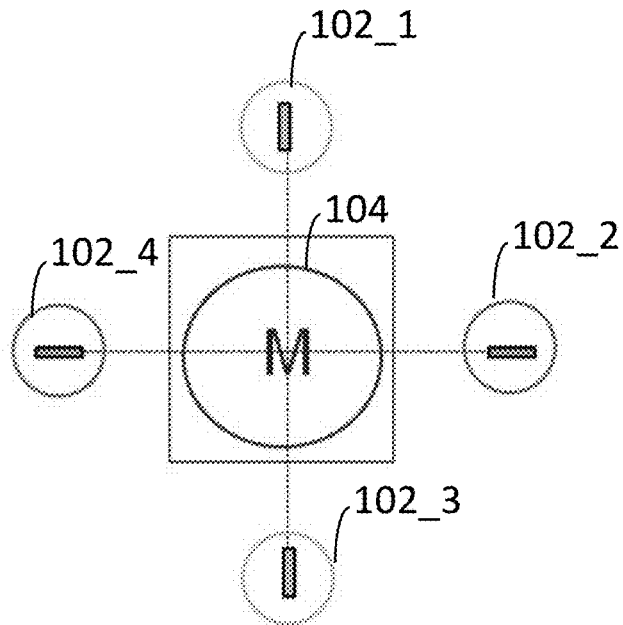

The techniques of the invention may be used to create any number of magnetic sensor and magnet configurations. FIG. 11 illustrates a system where a magnet is surrounded by four magnetic sensors. In FIG. 11 each magnet is designated by an M and each sensor is designated by an S. FIG. 12 illustrates a single magnet 104 and four associated sensors 102_1, 102_2, 102_3 and 102_4.

Figure 13:
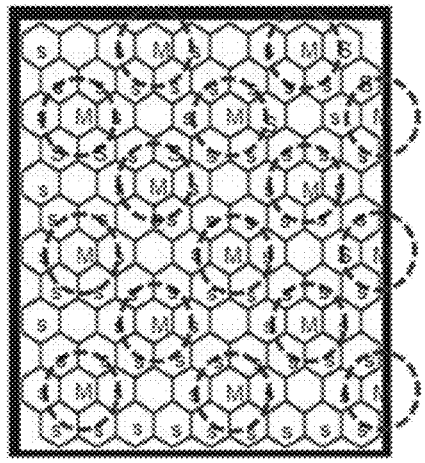
FIGS. 13-14 illustrate a magnetic sensor and magnet configuration in accordance with another embodiment of the invention.
Figure 14:
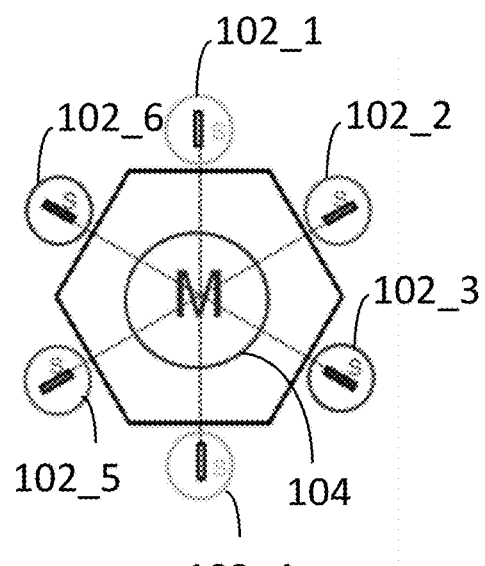

FIG. 13 illustrates a honeycomb system where a magnet is surrounded by six magnetic sensors. In FIG. 13 each magnet is designated by an M and each sensor is designated by an S. FIG. 14 illustrates a single magnet 104 and six associated sensors 102_1, 102_2, 102_3, 102_4, 102_5 and 102_6.

Figure 15:
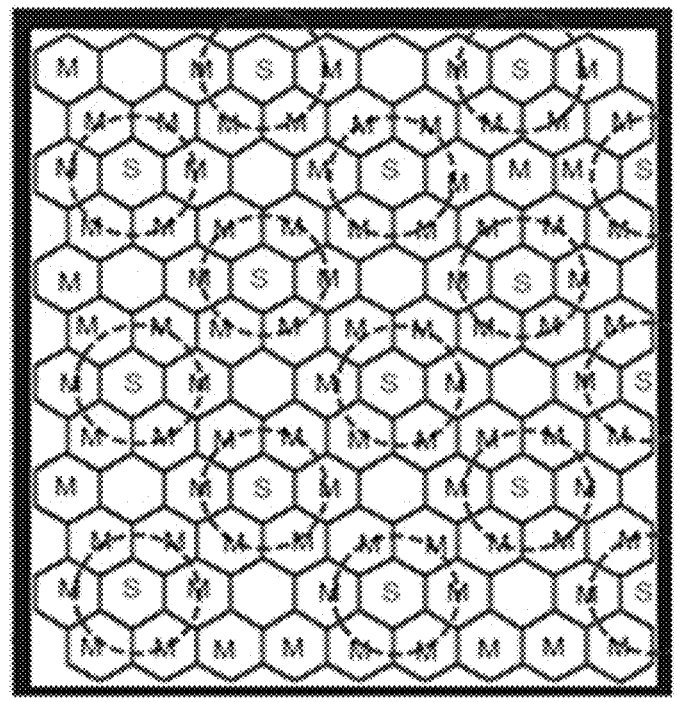
FIGS. 15-16 illustrate a magnetic sensor and magnet configuration in accordance with still another embodiment of the invention.
Figure 16:
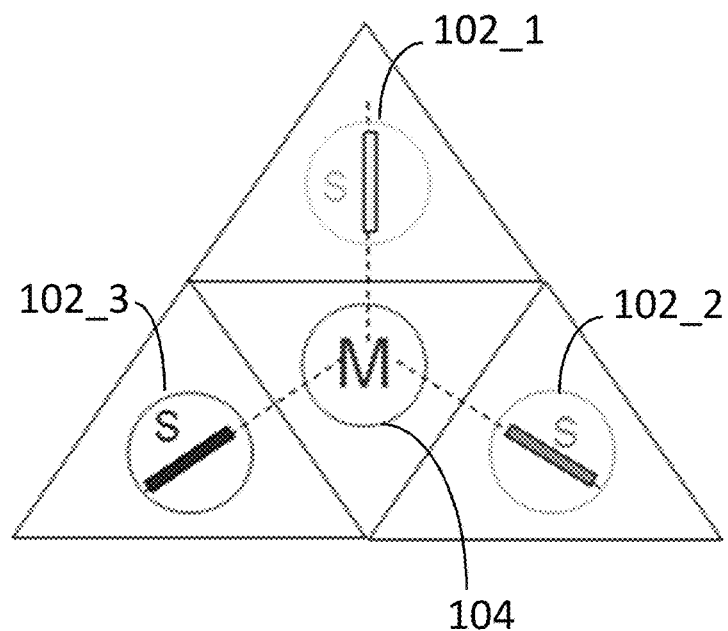

FIG. 15 illustrates a system where a magnet is surrounded by three magnetic sensors. In FIG. 15 each magnet is designated by an M and each sensor is designated by an S. FIG. 16 illustrates a single magnet 104 and three associated sensors 102_1, 102_2 and 102_3. Alternate embodiments include circles and other geometric patterns.

Figure 17:
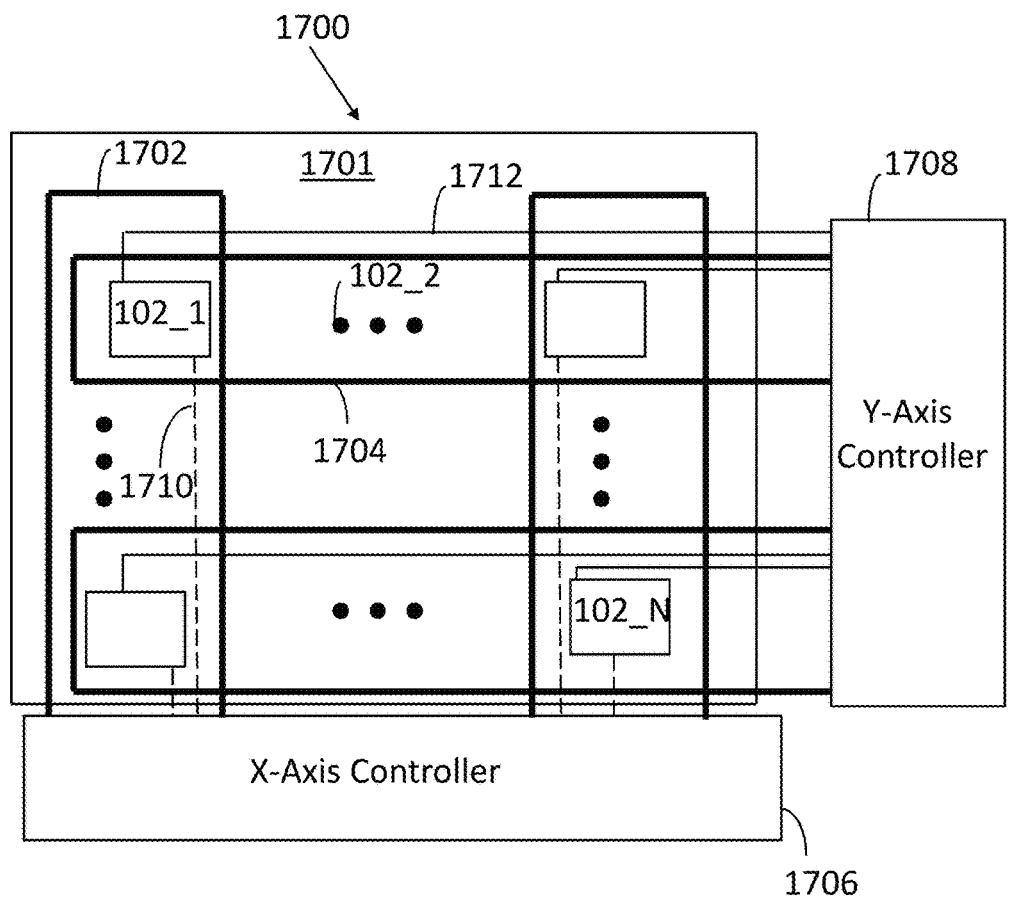
FIG. 17 illustrates a magnetic sensor surface shape analysis system configured in accordance with another embodiment of the invention.

FIG. 17 illustrates an alternate system 1700 configured in accordance with an embodiment of the invention. Substrate 1701 hosts a set of magnetic sensors 102_1 through 102 N. This system omits magnets. Instead, magnetic interactions are induced by currents driven through X-axis current paths 1702 and Y-axis current paths 1704. An X-axis controller 1706 drives the current on X-axis current path 1702. The X-axis controller 1706 also senses an X-axis magnetic sensor signal from line 1710. Similarly, the Y-axis controller 1708 drives the current on Y-axis current path 1704, while sensing a Y-axis magnetic sensor signal from line 1712. Maxwell's equations may be used to compute an induced magnetic field as a function of current, deformation of the flexible substrate and distance between the magnetic sensor and the current path.

Figure 18:
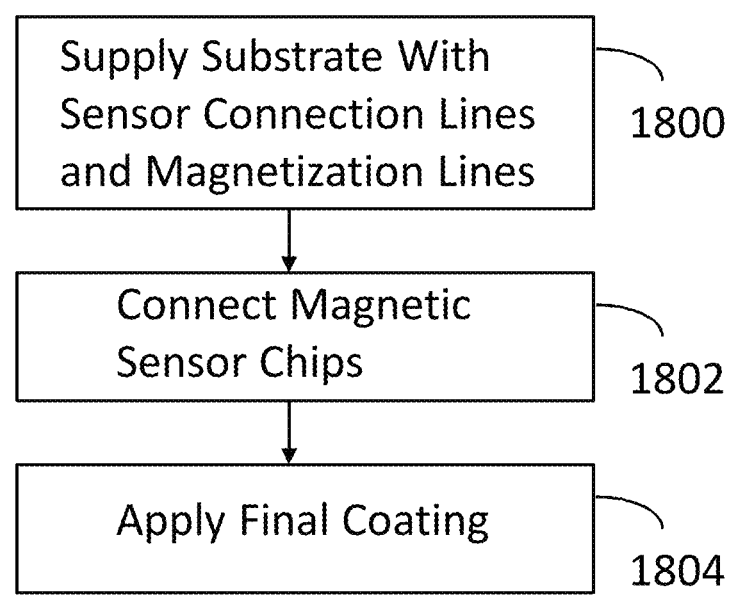
FIG. 18 illustrates processing operations to construct the system of FIG. 17.

FIG. 18 illustrates processing operations associated with the fabrication of the substrate of FIG. 17. A substrate is supplied with sensor connection lines and magnetization lines (i.e., X-axis current paths and Y-axis current paths) 1800. Magnetic sensor chips are connected 1802. A final protective coating is then applied 1804.

Thus, magnetic sensors are disclosed for surface shape analysis. The disclosed magnetic sensors may be incorporated into any number of devices for shape analysis, such as game controllers, physical movement analyzers, airplane wing force analyzers and devices for measuring deformations of solids and liquids. The output of such devices may be used in any number of ways. For example, the disclosed flexible substrate and associated magnetic sensors may be applied to a display (e.g., a television display, computer display, wearable device display) to analyze surface distortion and then make corrective image projection adjustments.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A device, comprising;
    magnetic sensors and magnets in an array on a flexible substrate, wherein each magnetic sensor is sensitive to laterally offset proximate magnets, and
    at least one controller to evaluate magnetic sensor signals from the magnetic sensors produced in response to deformation of the flexible substrate to characterize surface shape of the flexible substrate, wherein the at least one controller collects reference magnetic sensor signals when the flexible substrate is flat, first polarity magnetic sensor signals in response to deformation of the flexible substrate in a first direction and second polarity magnetic sensor signals in response to deformation of the flexible substrate in a second direction.

2. The device of claim 1 wherein the reference magnetic sensor signals are zero or set at a determined value.

3. The device of claim 1 wherein the first polarity magnetic sensor signals and the second polarity magnetic sensor signals are each a function of an angle characterizing the deformation of the flexible substrate.

4. The device of claim 1 wherein the magnetic sensors and magnets include pairs comprising one magnetic sensor and one magnet.

5. The device of claim 1 wherein the magnetic sensors and magnets include groups defined by triangles with one magnet and three magnetic sensors.

6. The device of claim 1 wherein the magnetic sensors and magnets include groups defined by triangles with one magnetic sensor and three magnets.

7. The device of claim 1 wherein the magnetic sensors and magnets include groups defined by squares with one magnet and four magnetic sensors.

8. The device of claim 1 wherein the magnetic sensors and magnets include groups defined by squares with one magnetic sensor and four magnets.

9. The device of claim 1 wherein the magnetic sensors and magnets include groups defined by honeycombs with one magnet and six magnetic sensors.

10. The device of claim 1 wherein the magnetic sensors and magnets include groups defined by honeycombs with one magnetic sensor and six magnets.

11. The device in claim 1 wherein magnetic sensors and magnets are in different planes within the flexible substrate.

12. The device of claim 1 positioned on a display.

13. The device of claim 1 positioned on a game console.

14. The device of claim 1 positioned on an airplane.

15. The device of claim 1 positioned on an automobile.

16. A device, comprising;
    a flexible substrate supporting magnetic sensors and magnetization lines that carry currents inducing selective magnetization of the magnetic sensors; and
    one or more controllers to collect magnetic sensor signals from the magnetic sensors, wherein the one or more controllers collect reference magnetic sensor signals when the flexible substrate is flat, first polarity magnetic sensor signals in response to deformation of the flexible substrate in a first direction and second polarity magnetic sensor signals in response to deformation of the flexible substrate in a second direction, wherein the one or more controllers.

17. The device of claim 16 wherein the reference magnetic sensor signals are zero or below some minimum signal threshold.

18. The device of claim 16 wherein the first polarity magnetic sensor signals and the second polarity magnetic sensor signals are each a function of the currents inducing selective magnetization, an angle characterizing the deformation of the flexible substrate and the distance between the magnetic sensors and magnetization lines.

* * * * *